March 13, 1962 3,024,668
SVEN-OLOF KARLSSON NOW BY CHANGE OF NAME
SVEN-OLOF KRONOGARD ET AL
CHANGE SPEED GEARINGS PARTICULARLY FOR MOTOR VEHICLES
Original Filed Sept. 10, 1954
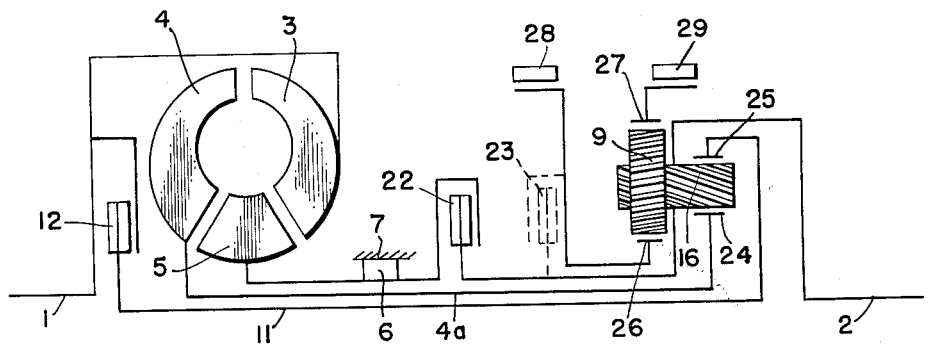
INVENTORS
SVEN-OLOF KARLSSON
NOW BY CHANGE OF NAME
SVEN-OLOF KRONOGARD
AND ERIK VIUFF QUISTGAARD
BY Pierce, Scheffler & Parker
ATTORNEYS

United States Patent Office 3,024,668
Patented Mar. 13, 1962

3,024,668
CHANGE SPEED GEARINGS PARTICULARLY FOR MOTOR VEHICLES
Sven-Olof Karlsson, now by change of name Sven-Olof Kronogard, and Erik Viuff Quistgaard, Gothenburg, Sweden, assignors to Aktiebolaget Volvo, Gothenburg, Sweden, a corporation of Sweden
Original application Sept. 10, 1954, Ser. No. 455,207, now Patent No. 2,919,606, dated Jan. 5, 1960. Divided and this application Feb. 27, 1959, Ser. No. 1,148
2 Claims. (Cl. 74—688)

The present invention refers to change speed gearings, particularly for motor vehicles, wherein the torque from a driving shaft is distributed onto two intermediate shafts, and is transmitted over a planetary gearing onto a driven shaft. This application is a divisional application of my earlier-filed parent application Serial No. 455,207 filed September 10, 1954, and now Patent No. 2,919,606 and entitled "Change Speed Gearings Particularly for Motor Vehicles. The invention has for its object to provide facilities with simple means for obtaining at least two forward speeds and one rearward speed. To this end, the arrangement according to the invention is principally distinguished by the feature that one of the two intermediate shafts is connected to a sun gear and the other to a ring gear in the planetary gearing, which latter comprises a total of at least four sun and ring gears and two sets of planet gears, at least one of these sets consisting of gears engaging each into at least three other gears, besides which facilities are provided to transmit a portion of or the whole torque over one of the two shafts. Preferably, a hydraulic torque converter should in this connection be provided between the driving shaft and one of the intermediate shafts.

The invention will be explained in the following specification with reference to the accompanying drawing in which the single figure is a diagrammatic illustration of the motor vehicle transmission change speed gearing.

The sole figure illustrates a simple gearing arrangement with provision for two forward speeds and one backward speed. The planet gears 9 and 16 are arranged on the same carrier while being in meshing engagement with one another. Arranged on the second intermediate shaft 4a connected to the turbine wheel 4 is a sun gear 24, while the first intermediate shaft 11 carries a ring gear 25, the two last-mentioned gears cooperating with the planet gears 16. The planet gears 9 cooperate with a sun gear 26 and a ring gear 27, both of which gears may be locked by means of brake bands 28 and 29, respectively. The intermediate shaft 11 is connected to the engine shaft 1 by means of the clutch 12, said engine shaft 1 being connected to the pump wheel 3 of the hydraulic torque converter.

When the brake band 28 is tightened up, the entire torque flux passes through the torque converter 3—5 and the intermediate shaft 4a onto the sun gear 24 and over the planet gears 16 and 9, which latter gears roll on the sun gear 26, so that the common planet gear carrier and thus the output shaft 2 rotate in a forward direction. If the brake band 29 is pulled tight instead, the ring gear 27 will be locked, the planet gears 9 then rolling on the same, rearward running of the shaft 2 being thus obtained. If both brake bands 28 and 29 are loosened and the first clutch 12 is thrown into engagement between the engine shaft 1 and the intermediate shaft 11, a coupling position will be obtained corresponding to a direct gear condition, the principal torque flux then passing through the intermediate shaft 11 and only a smaller portion thereof through the torque converter.

The guide blade rim 5 is connected to the output shaft 2 by means of a second clutch 22, two operating conditions being thus obtained in the hydraulic portion, said conditions resembling, for instance, a double rotation and a single rotation with respect to their effects and so that with a rearwardly directed torque a certain braking effect will be obtained at co-rotation of the guide blade rim 5. If desired, a third clutch 23 may be connected between sun gear 26 and the carrier as shown by the phantom lines in the drawing.

It holds true for the embodiment shown and described above that two sets of planet gears and in total at least four sun and ring gears are available, the wheels of one set then being in engagement with at least three other gears, which condition makes it possible to distribute the torque flux in an advantageous manner over the intermediate shafts and, with the use of a hydraulic torque converter, to disengage the latter, wholly or in part, in normal driving, which brings about an improved efficiency. However, the input planetary gearing does not necessarily presuppose the existence of a hydraulic torque converter. Also, the invention is not otherwise tied to the arrangements shown, but may be varied within the scope of the appended claims.

What we claim is:
1. In a change speed gearing particularly adapted for use in motor vehicles for transmitting torque from a driving shaft to a driven shaft, the combination comprising independently rotatable first and second intermediate shafts, first clutch means connecting said first intermediate shaft to said driving shaft, hydraulic torque converter means connecting said second intermediate shaft to said driving shaft, a first planetary gearing comprising a sun gear, a ring gear and planet gears carried by a carrier, said first intermediate shaft being connected to said ring gear and said second intermediate shaft being connected to said sun gear, a second planetary gearing comprising at least one sun gear, a ring gear, and planet gears carried by said carrier and meshing with the planet gears of said first planetary gearing, said carrier being connected to said driven shaft, first brake means for braking the sun gear of said second planetary gearing, second brake means for braking the ring gear of said second planetary gearing, said hydraulic torque converter means including a pump wheel, a turbine wheel and a guide blade rim free to rotate in one direction, said driving shaft being connected to said pump wheel and said second intermediate shaft being connected to said turbine wheel, and further including second clutch means connecting said guide blade rim to said driven shaft.

2. Apparatus as defined in claim 1, and further including clutch means intermediate said planet gear carrier and the sun gear of said second planetary gearing.

References Cited in the file of this patent
UNITED STATES PATENTS 2,195,783   Ravigneaux _____ Apr. 2, 1940
2,277,214   Dodge _____ Mar. 24, 1942